United States Patent
Best et al.

(10) Patent No.: US 10,956,826 B2
(45) Date of Patent: Mar. 23, 2021

(54) ROOT CAUSE ANALYSIS VALIDATION THROUGH INVERSE CAUSATION

(71) Applicant: International Business Machines Corporation, Armonk, NY (US)

(72) Inventors: Rodney D. Best, Valencia, CA (US); Randy S. Johnson, O'Fallon, MO (US); Tedrick N. Northway, High Springs, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1124 days.

(21) Appl. No.: 15/153,021

(22) Filed: May 12, 2016

(65) Prior Publication Data

US 2017/0330098 A1    Nov. 16, 2017

(51) Int. Cl.
    *G06N 5/04*    (2006.01)
(52) U.S. Cl.
    CPC ................. *G06N 5/045* (2013.01)
(58) Field of Classification Search
    CPC ............... G06F 11/079; G06N 5/045
    See application file for complete search history.

(56) References Cited

U.S. PATENT DOCUMENTS

| 7,385,716 B1* | 6/2008 | Skaanning | G06F 11/0733 358/1.14 |
|---|---|---|---|
| 8,276,152 B2 | 9/2012 | Sanghvi et al. | |
| 8,375,370 B2 | 2/2013 | Chaar et al. | |
| 2005/0132253 A1* | 6/2005 | Gail | G06F 11/0709 714/25 |
| 2006/0106796 A1* | 5/2006 | Venkataraman | G05B 23/0216 |
| 2012/0116850 A1 | 5/2012 | Abe et al. | |
| 2015/0149541 A1* | 5/2015 | Kanjirathinkal | H04L 67/104 709/204 |
| 2016/0124951 A1* | 5/2016 | Barker | G06F 40/284 706/12 |

OTHER PUBLICATIONS ip.com, Mechanism for Operational Risk Monitoring, System Testing Optimization and Root Cause Analysis for Complex Applications, Jul. 9, 2014.
ip.com; Method and System to use Service Management Data to Develop an Automated Root Cause Analysis for a Service, Mar. 11, 2012.
Rowan, Is It Possible to Have Lightning Without Thunder?, Life's Little Mysteries Managing Editor | Jul. 15, 2010.

* cited by examiner

*Primary Examiner* — Kamran Afshar
*Assistant Examiner* — Marshall L Werner
(74) *Attorney, Agent, or Firm* — Garg Law Firm, PLLC; Rakesh Garg; James Nock

(57) ABSTRACT

From a sequence of answers, a last remaining answer is selected. A set of answers in the sequence of answers are responsive to a set of questions resolved during an analysis of a reported problem in a data processing environment. An answer pair is formed using the last remaining answer and another answer which immediately precedes the last remaining answer in the sequence of answers. A probability is determined of the last remaining answer being caused by the other answer in the answer pair. When the probability is below a threshold value, a review workflow is triggered corresponding to a portion of the analysis. The portion includes a question corresponding to an answer in the answer pair.

18 Claims, 4 Drawing Sheets

ROOT CAUSE ANALYSIS VALIDATION THROUGH INVERSE CAUSATION

TECHNICAL FIELD

The present invention relates generally to a method, system, and computer program product for validating a problem analysis. More particularly, the present invention relates to a method, system, and computer program product for root cause analysis validation through inverse causation.

BACKGROUND

A problem is a report of an issue in a data processing environment. The issue can take the form of an error, a malfunction, a missed action, a failure of an operation, an unacceptable performance or operation, and the like.

When a problem is reported in a data processing environment, an analyst analyzes a reason for the occurrence of the problem. Generally, but not necessarily, the analysis begins with a question that takes the form of "why" or "what" type of questions. For example, the analysis may begin with the question—"why did <the problem> occur," which receives an answer from a system or an analyst. The answer leads to another question—"why did/what caused <the issue in the answer> to occur." This question again receives an answer, which leads to another why or what type of question. This sequence of progressive questions and answers attempts to drill down into the basis cause—known as the root cause—that caused the problem.

Generally, an answer in this sequence of questions and answers is accepted as the root cause when the answer is either (i) sufficiently detailed such that the reported problem can be solved, (ii) such that further why or what questions would lead to nonsensical, mundane, trivial, or argumentative answer, or (iii) the analyst is satisfied that the answer has identified an element of the data processing environment where some occurrence directly or indirectly resulted in the problem. Once the root cause is determined, the sequence of progressively drilling-down questions and answers stops, and the identified root cause is remedied in the data processing environment with the expectation that the problem is either remedied or that the problem has been prevented from reoccurring.

A question and answer system (Q and A system) is an artificial intelligence application executing on data processing hardware. A Q and A system answers questions pertaining to a given subject-matter domain presented in natural language.

Typically, a Q and A system is provided access to a collection of domain specific information based on which the Q and A system answers questions pertaining to that domain. For example, a Q and A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain.

SUMMARY

The illustrative embodiments provide a method, system, and computer program product. An embodiment includes a method that selects, from a sequence of answers, a last remaining answer, wherein a set of answers in the sequence of answers are responsive to a set of questions resolved during an analysis of a reported problem in a data processing environment. The embodiment forms an answer pair using the last remaining answer and another answer which immediately precedes the last remaining answer in the sequence of answers. The embodiment determines a probability of the last remaining answer being caused by the other answer in the answer pair. The embodiment triggers, responsive to the probability being below a threshold value, a review workflow corresponding to a portion of the analysis, wherein the portion includes a question corresponding to an answer in the answer pair.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
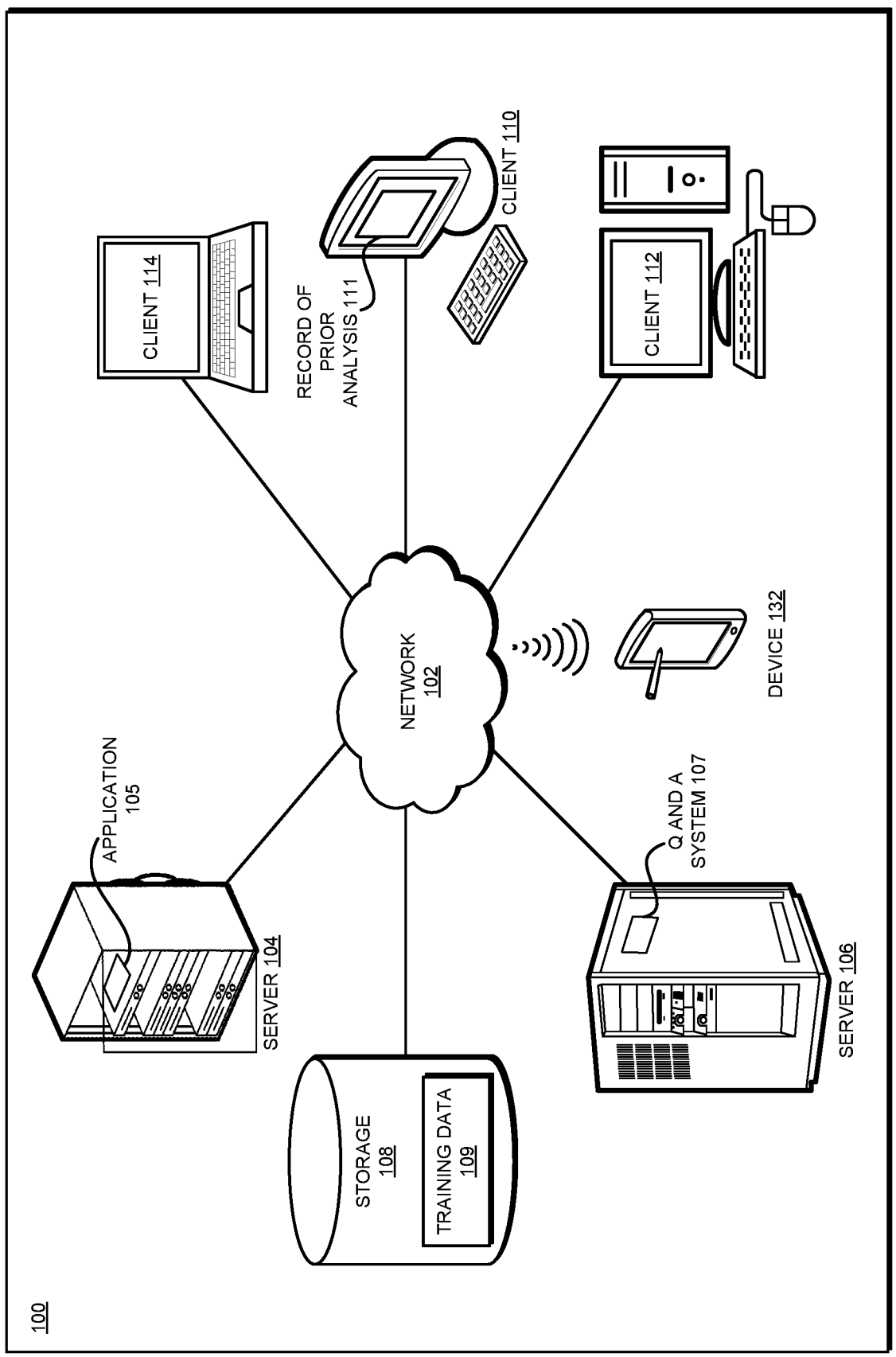
FIG. 1 depicts a block diagram of a network of data processing systems in which illustrative embodiments may be implemented.

The illustrative embodiments recognize that root cause analysis of a problem according to a presently used method can often misdirect the investigation and mislead to an incorrect or incomplete resolution of the problem. The illustrative embodiments recognize that generally, the misdirection occurs in the sequential questions and answers, where an answer does not have sufficient causal link or relationship with the previous answer in the sequence.

As an example, suppose that a reported problem is— Clients were not notified of missing information for grant proposal filing. The root cause analysis of this problem may take the following form—

Question #1: Why were clients not notified of missing information for grant proposal filing?

Answer #1: Application xyz was unable to write to the "C:\" drive in an important processing step.

Question #2: Why was application xyz unable to write to the "C:\" drive in an important processing step?

Answer #2: There was insufficient space on the "C:\" drive. Only 860 MB of free space was available while more than 860 MB of free space was needed by the application.

Question #3: Why was there insufficient space (i.e., less free space than needed by the application) on the "C:\" drive?

Answer #3: The web server log files were filling the "C:\" drive.

Question #4: Why was there no alert generated and sent to indicate the drive space threshold had been reached?

Answer #4: The alerting & monitoring team is analyzing the alert system and threshold settings on the server in question.

In this example sequence of answers 1-4, the lack of alerting and the poorly tuned monitoring threshold—which follows from answer 4—may have been contributing causes, and in some rare cases may be considered a root cause, but barring such rare cases, there exists a low probability that the lack of alerting and the poorly tuned monitoring threshold is a valid root cause. In other words, answer 4 does not logically relate to answer 3 in that the probability that answer 4 is caused by answer 3 is below a threshold probability.

The illustrative embodiments recognize that incorrect identification of the root cause of a problem may operate to either (i) cause in the data processing environment a change that does not remedy the problem, (ii) change something that temporarily masks the problem but does not prevent a reoccurrence of the problem, or (iii) worse, causes something to change that not only not remedies the problem but creates a new problem. Thus, the illustrative embodiments recognize that validation of an identified root cause is critical to successful remediation of a reported problem.

The illustrative embodiments used to describe the invention generally address and solve the above-described problems and other problems related to root cause identification by validating the identified root cause through reverse causation analysis.

An embodiment can be implemented as a software application. The application implementing an embodiment can be configured as a modification of an existing Q and A system, as a separate application that operates in conjunction with an existing Q and A system, a standalone application, or some combination thereof.

Given a sequence of answers from a prior root cause analysis exercise related to a problem, an embodiment determines a probability value of a causation relationship between an answer in the sequence (A1) with an immediately preceding answer in the sequence (A2). The embodiment accepts answer A1 as an answer in a valid root cause analysis of the given problem if answer A1 has a greater than a threshold level or value of probability that A1 is caused by or as a result of A2 in the subject-matter domain of the problem. In the above example, the subject-matter domain of the problem "Clients were not notified of missing information for grant proposal filing" includes the operations details of a data processing environment, such as a datacenter.

Consider another example—
The problem: My car will not start.
Question #1: Why?
Answer #1: The battery is dead.
Question #2: Why?
Answer #2: The alternator is not functioning.
Question #3: Why?
Answer #3: The alternator belt has broken.
Question #4: Why?
Answer #4: The alternator belt is well beyond its useful service life and has never been replaced.
Question #5: Why?
Answer #5: I have not been maintaining my car according to the recommended service schedule.

Here, the subject-matter domain of the problem is automotive technology and automotive repair. The embodiment determines that the reverse causation relationship between answer 5 and answer 4 is more probable than a threshold probability. Reverse causation, or reverse causation relationship, in a sequence of answers in a prior root cause analysis of a problem is the determination of a degree or probability that the substance of an answer in the sequence is caused by the substance of the previous answer in the sequence.

Similarly, the embodiment determines that the reverse causation relationship between answer 4 and answer 3 is more probable than a threshold probability, and so on.

Further questions and answers beyond this example answer #5 will likely result in inconsequential answers, such as (question #6) why, (answer #6) I do not have money (answer #6); (question #7) why, (answer #7) because I don't have a required degree for a specific job; etc.

Such answers will begin to digress from the problem and have increasingly distant relationship with the reported problem. As can be seen from the above example, in the progressively converging answers, not maintaining the car is the closest convergent answer on the problem of the car not starting, before further answers, such as "not having a degree", begin to diverge from the problem. Accordingly, if answers 6 and 7 are provided, the embodiment may determine that reverse causation relationship between answer 6 and answer 5 is less probable than the reverse causation relationship between answer 5 and answer 4. Similarly, the reverse causation relationship between answer 7 and answer 6 is even more tenuous and therefore less probable than the reverse causation relationship between answer 6 and answer 5, and so on.

Thus, the embodiment validates through reverse causation relationship probability determination that answer 5 is the root cause of the problem "my car will not start" because "I have not been maintaining my car according to the recommended service schedule." Here, the prior root cause analysis has come to the correct identification of the root cause as validated by the embodiment.

In comparison, in the previous example root cause analysis of the problem "Clients were not notified of missing information for grant proposal filing", the embodiment would not validate through reverse causation relationship probability determination that answer 4 is the root cause of the problem because the probability that lack of alerting and the poorly tuned monitoring threshold—which follows from the natural language processing (NLP) of answer 4—was caused by—or causation related to—answer 3 is below a threshold probability.

To determine the causation relationship probability between two consecutive answers in a prior root cause analysis answers sequence, the embodiment employs a Q and A system. The embodiment trains the Q and A system using corpora of documents and information related to the subject-matter domain of a given problem. A1 ternatively, the embodiment selects a Q and A system that has been trained on the subject-matter domain of a given problem.

The embodiment selects an answer pair, to wit, an answer (A1) in the sequence of answers and the immediately preceding answer in the sequence (A2). Preferably, but not necessarily, the selection of the answer pair begins with A1 being the last or ultimate answer in the sequence, e.g., fifth in a sequence of five answers, and A2 being the penultimate answer in the sequence, e.g., fourth in the sequence of five answers.

The embodiment formulates, or causes to be formulated, a question (Q) for the Q and A system, e.g., what is the probability that A1 results from A2 for <the problem statement>, or another question to the same effect. The text in angle brackets is replaced with the actual problem statement for which the analysis is being performed.

The embodiment submits question Q and answer pair A1-A2 to the Q and A system. The Q and A system, using the knowledge of the subject-matter domain of the problem, determines a causal relationship between A2 and A1 and a likelihood of such causal relationship given the knowledge. The Q and A system returns to the embodiment the likelihood of A1 causing A2 in the subject-matter domain of the problem. The embodiment uses the likelihood as the probability of a causation relationship between A1 and A2.

If the probability exceeds an acceptance threshold probability, or upper threshold, the embodiment proceeds to the next answer pair as described herein. If the probability is in a specified range, e.g., between two thresholds, the embodiment triggers a workflow which would cause a question, an answer, or both, to be reviewed. In some cases, the review workflow may send the question back to the analyst.

If the probability is below a lower threshold probability, the embodiment triggers a re-analysis workflow which would cause all or part of the root cause analysis to be re-performed. In some cases, the re-analysis workflow may send the question back to the analyst.

When the embodiment proceeds further, such as after a previous answer pair exceeding the upper threshold, or regardless of the probability of the previous answer pair, the embodiment constructs the next answer pair. The embodiment constructs the next answer pair by removing from further consideration the later of the two answers in the previous answer pair, e.g., the fifth of the five answers in the sequence in the above example. For example, the embodiment selects the next answer pair, e.g., making A1 the fourth answer in the sequence of five, and making A2 the third answer in the sequence of five in the above example. The embodiment determines the probability of causation relationship between the new A1-A2 pair in a similar manner as described herein. The embodiment continues to analyze A1-A2 pairs, potentially all the way up to the time when the first answer A2.

Optionally, in some cases, before performing the probability determination using the Q and A system, the embodiment also arranges the available answers in a suitable sequence using the Q and A system. For example, multiple analysts may pursue multiple lines of questions in parallel to solve a problem. The analysis may end up with different subsets of answers which when combined into a set may not be ordered in a logical sequence of progressively converging answers. The answers in the combined set of answers may have to be sequenced or re-sequenced. The embodiment uses NLP and insights from the Q and A system into the answers in the set to arrange the answers in a logical sequence of causation.

In one embodiment, a problem statement, an answer pair in an answer sequence corresponding to the problem, and a determined probability of causation relationship are fed back into a training dataset for the Q and A system. Enhancing the training dataset with actual problem statements, answer pairs in actual answer sequences corresponding to the actual analyzed problems, and actual determined probabilities of causation relationships help improve the accuracy, speed, or both, of the Q and A system for subsequent analyses in the problem's subject-matter domain.

Similarly, in another embodiment, when a review workflow or a reanalysis workflow causes a change in a question, an answer, or both in a revised root cause analysis, the changes are fed back into the training dataset for a similar enhancement of the Q and A system. In some cases, an analyst may decide that even though the Q and A system determined a low probability of causal relationship between two answers, specific circumstances supported those answers. The supporting information, the description of the circumstances, and other information which conflicts with the determination made by the Q and A system can also be fed back into the training data set. Such information helps train the Q and A system for recognizing special circumstances, rare occurrences, and other nuances of the subject-matter domain.

A method of an embodiment described herein, when implemented to execute on a device or data processing system, comprises substantial advancement of the functionality of that device or data processing system in validating the root cause determination in solving a problem. For example, presently available methods for root cause analysis have no automated method for verification whether the root cause analysis proceeded logically enough to result in a correct determination of the root cause. Often, whether the determined root cause is correct or not is discovered only after the passage of time and reoccurrences of a problem that was considered solved. An embodiment provides a method for automatically validating a root cause analysis methodology by performing reverse causation analysis on the answers collected during a root cause analysis question and answer session. This manner of root cause analysis validation through inverse causation is unavailable in the presently available methods. Thus, a substantial advancement of such devices or data processing systems by executing a method of an embodiment is in ensuring that a determined root cause is the logically correct root cause given the available knowledge of the subject-matter domain of the problem being solved.

The illustrative embodiments are described with respect to certain types of problems, subject-matter domains, questions, answers, numbers of answers in a sequence, convergence point in a root cause analysis, probability thresholds, workflows, changes, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
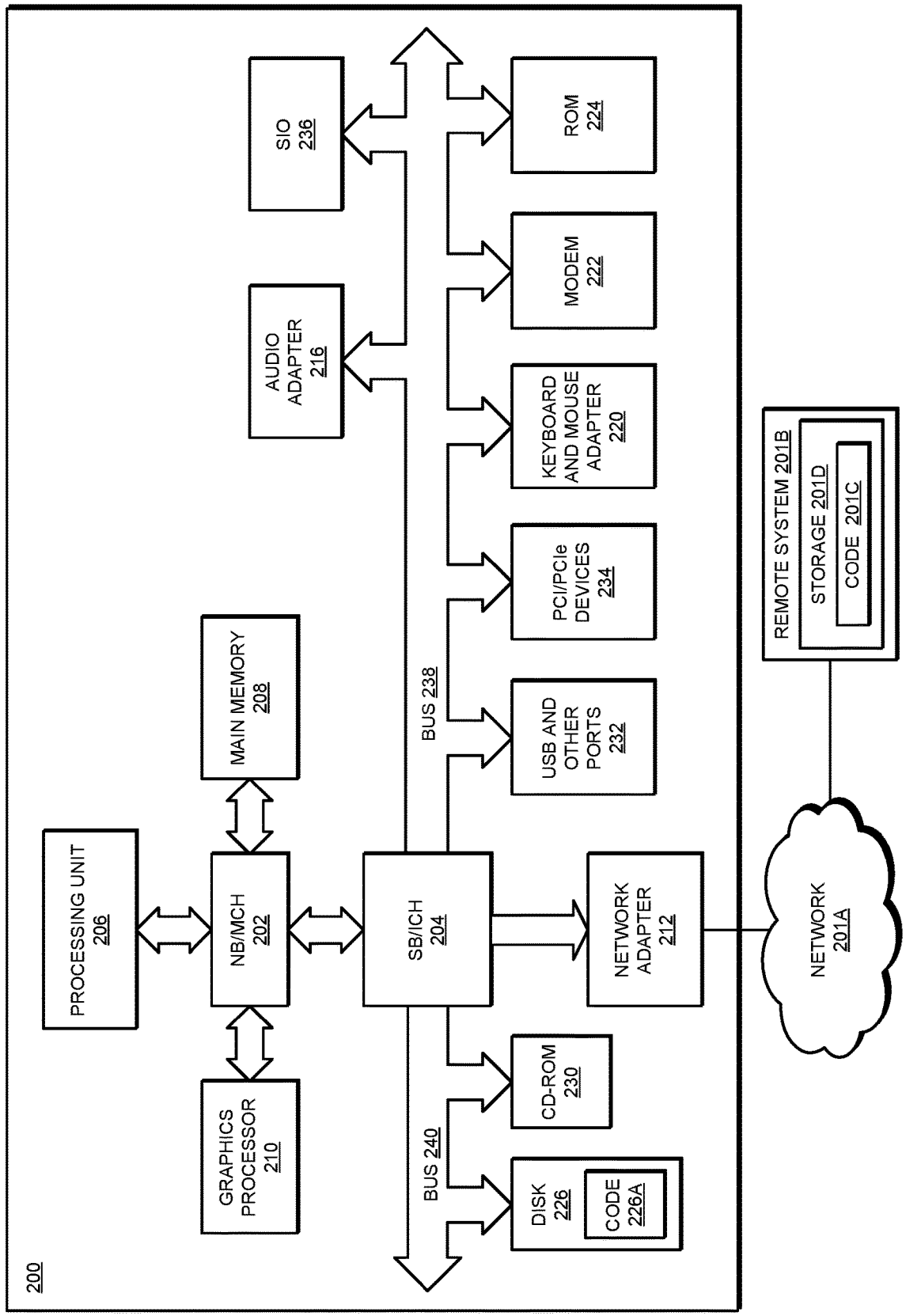
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 uses or constructs a sequence of answers based on the answers collected in record 111 of a previously performed root cause analysis of a problem. Application 105 uses Q and A system 107 to determine a probability of causation relationship between consecutive answers in the answer sequence of record 111, as described herein. Q and A system 107 is trained using training dataset 109. Training dataset 109 is enriched by, or caused to be enriched by, application 105, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
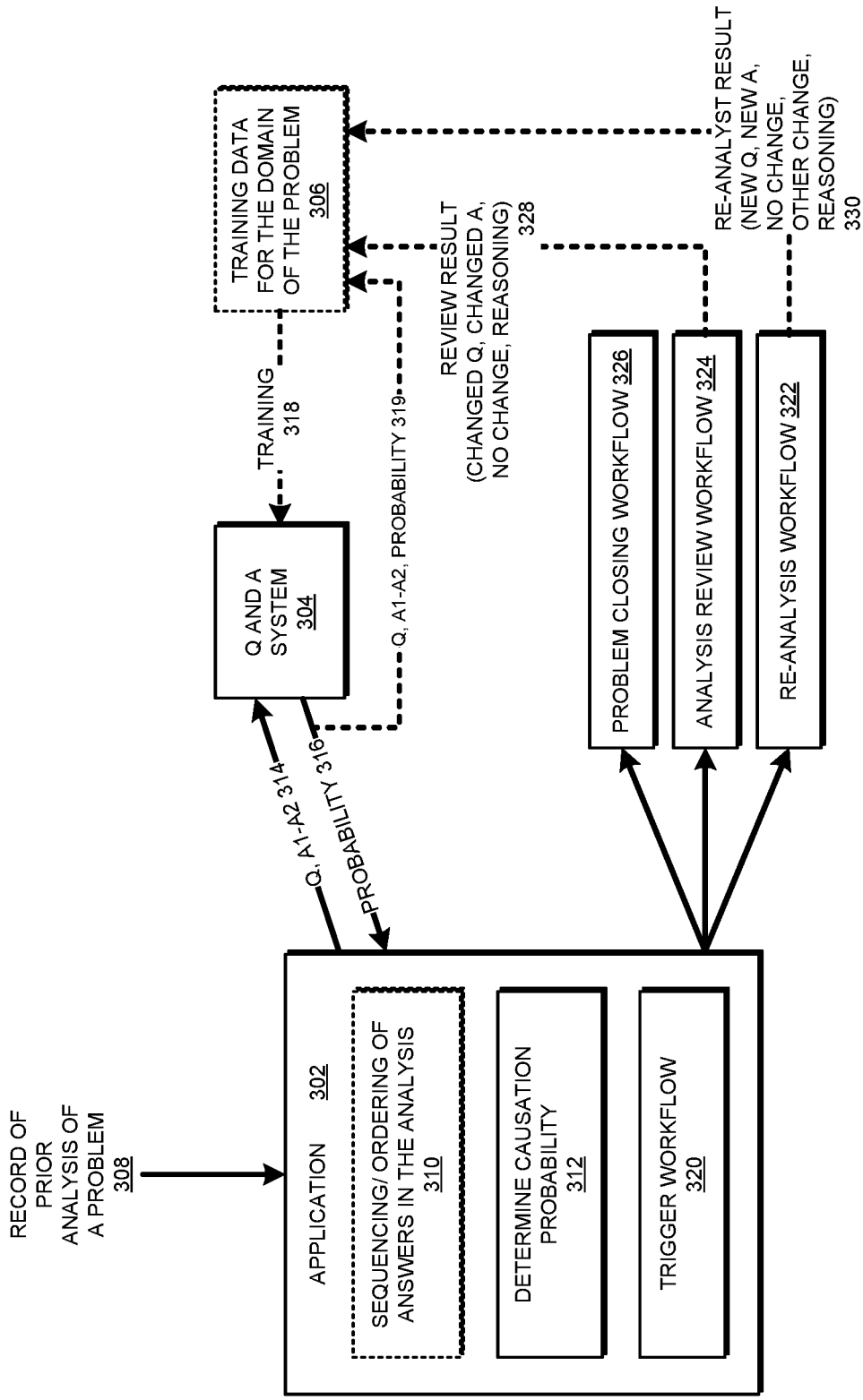
FIG. 3 depicts a block diagram of an example configuration for root cause analysis validation through inverse causation in accordance with an illustrative embodiment.

With reference to FIG. 3, this figure depicts a block diagram of an example configuration for root cause analysis validation through inverse causation in accordance with an illustrative embodiment. Application 302 is an example of application 105 in FIG. 1. Q and A system 304 is an example of Q and A system 107 in FIG. 1. Training data 306 is an example of training data 109 in FIG. 1. Input 308 is a record of a prior root cause analysis of a problem, similar to record 111 in FIG. 1. Input 308 includes a set of answers collected during the root cause analysis exercise.

In many cases, the answers in the set of answers in record 308 are already sequenced according to progressively increasing convergence on the given problem in a manner described herein. When the answers are not so arranged, component 310 optionally sequences the answers in the set of answers in input 308 to form such a sequence of answers.

Component 312 selects, from the sequence of answers, an answer pair A1-A2 in a manner described herein. Component 312 formulates a question Q to present to Q and A system 304. Component 312 sends (314) question Q, and answer pair A1-A2, and optionally the problem statement for record 308, to Q and A system 304.

Q and A system 304 returns (316) a probability that A1 is caused by A2 given Q and A system 304's knowledgebase according to training 318. Training 318 has previously trained Q and A system 304 about the subject-matter to which the problem of record 308 pertains. The question, the answer pair, and the determined probability also enrich (319) training dataset 306 as described herein.

Only as a non-limiting example, assume a tri-band range of probabilities. The low band ranges from a probability of 0 up to and including a low threshold probability value. The mid-band ranges from a probability above the low threshold up to and including a high threshold probability value. The high band ranges from a probability above the high threshold up to and including a maximum probability value, e.g., 1. These examples of probability range, thresholds, and bands are not intended to be limiting. From this disclosure, those of ordinary skill in the art will be able to conceive many other ranges, thresholds, and bands, and the same are contemplated within the scope of the illustrative embodiments.

The probability value returned in message 316 is the probability of a causation relationship that A1 can be caused by A2 given the knowledge of the subject-matter. Component 312 passes the probability value to component 320. Depending on where the probability value falls in the defined bands of probability, component 320 triggers different actions.

For example, if the probability falls in the low band as described in the above non-limiting example, component 320 triggers re-analysis workflow 322. Within the scope of the illustrative embodiments, re-analysis workflow 322 may be triggered only for the answer pair corresponding to the probability value, another portion of record 308, or the entirety of record 308.

As another example, if the probability falls in the mid-band as described in the above non-limiting example, component 320 triggers analysis review workflow 324. Within the scope of the illustrative embodiments, analysis review workflow 324 may be triggered only for the answer pair corresponding to the probability value, another portion of record 308, or the entirety of record 308.

As another example, if the probability falls in the high band as described in the above non-limiting example, component 320 may optionally, and depending upon the implementation, trigger a problem closing workflow 326, which may close the reported problem as having been resolved to a valid root cause. Alternatively, when the probability falls in the high band, component 320 may indicate to component 312 that the causation relationship probability analysis of the next answer pair, if any, can proceed.

These examples triggering or example operations or workflows are not intended to be limiting. From this disclosure, those of ordinary skill in the art will be able to conceive many other ways of triggering other workflows or other operations, and the same are contemplated within the scope of the illustrative embodiments.

If a selected answer pair has a causation relationship probability that validates the corresponding portion of the root cause analysis, e.g., when the probability is in the high band of the above example, component 312 selects the next answer pair from record 308. For example, if the probability of answer 5 (A1) and answer 4 (A2) answer pair from a given answer sequence is in the high band, component selects answer 4 (new A1) and answer 3 (new A2) from the answer sequence for a causation relationship probability analysis using Q and A system 304 in a similar manner.

Components 312 and 320 continue validating a given answer sequence obtained from record 308 in this manner until one of the following occurs—(i) either all answer pairs result in probabilities that indicate acceptable causation relationships (e.g., by being in the example high band) and problem closing workflow 326 is triggered; or (ii) at least one answer pair results in a probability that indicate unacceptable causation relationships (e.g., by being in the example low band) and re-analysis workflow 322 is triggered; or (iii) at least one answer pair results in a probability that indicate questionable causation relationships (e.g., by being in the example mid-band) and analysis review workflow 324 is triggered.

Analysis review workflow 324 may cause a change in a question, a change in an answer, or no change relative to record 308. Furthermore, such change or no change may be accompanied by reasoning, e.g., from an analyst. Such additional data from review result 328 enriches training dataset 306 as described herein.

Similarly, re-analysis review workflow 322 may cause a change in a question, a change in an answer, some other change, or no change relative to record 308. Furthermore, such change or no change may be accompanied by reasoning, e.g., from an analyst. Such additional data from re-analysis result 330 enriches training dataset 306 as described herein.

Figure 4:
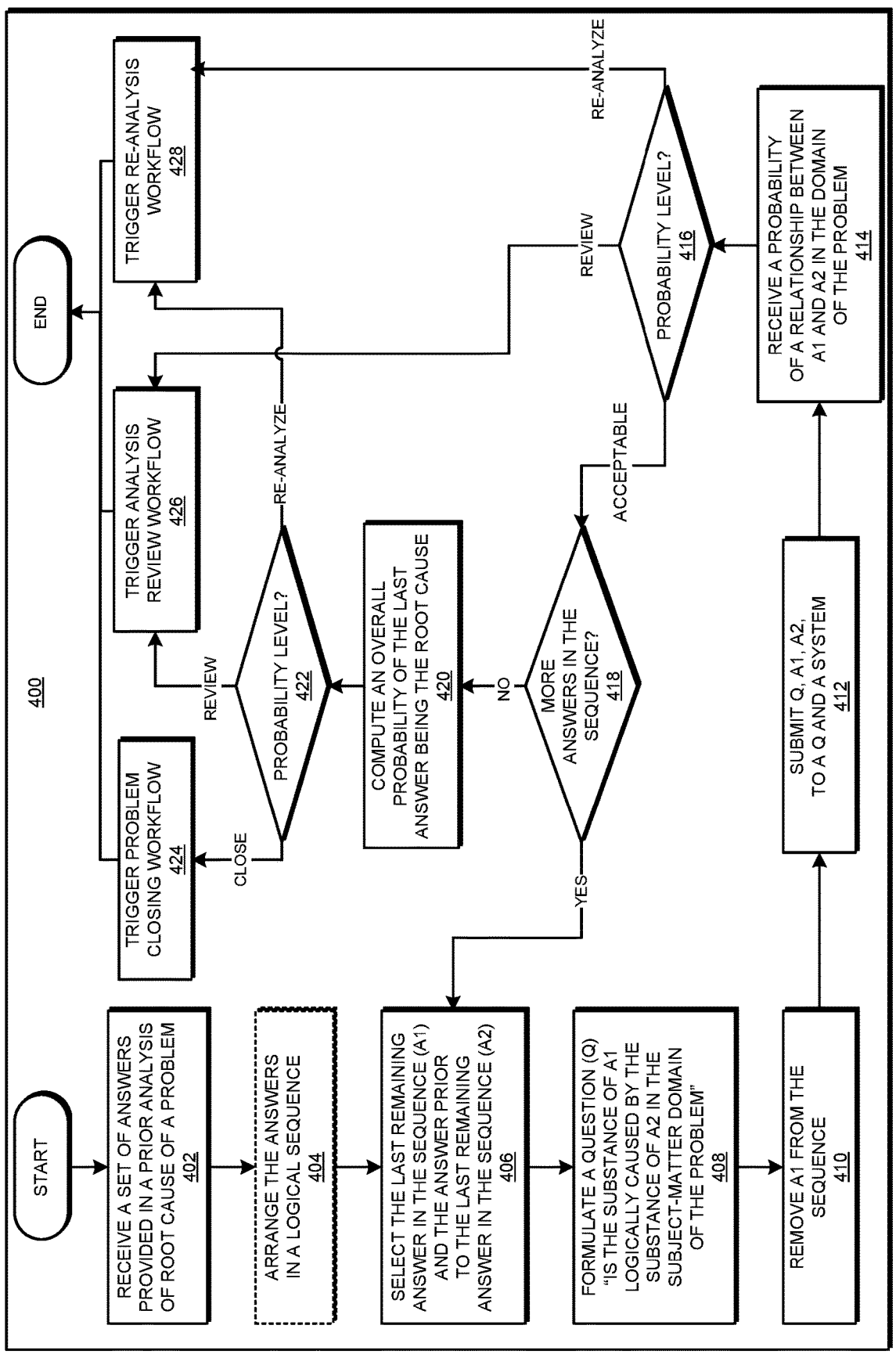
FIG. 4 depicts a flowchart of an example process for root cause analysis validation through inverse causation in accordance with an illustrative embodiment.

With reference to FIG. 4, this figure depicts a flowchart of an example process for root cause analysis validation through inverse causation in accordance with an illustrative embodiment. Process 400 can be implemented in application 302 in FIG. 3.

The application receives a set of answers that were provided in a prior analysis of a root cause of a problem (block 402). Optionally, as described herein, in some cases, the application sequences or re-sequences the set of answers in a logical sequence of convergence on the problem.

In a beginning iteration, all answers in the sequence are remaining for participation in an answer pair. Accordingly, in the beginning iteration, the last remaining answer is an answer that is last in the sequence, i.e., which has been determined to be the root cause in the prior analysis. From the sequence of answers, the application selects the last remaining answer as A1 and the answer immediately prior to answer A1 in the sequence as A2 (block 406).

The application formulates, or causes to be formulated, a question (Q) of substantially the form—what is the probability that the substance of A1 logically caused by the substance of A2 (block 408). The substance of an answer includes (i) a direct or indirect meaning or inference of the answer, (ii) an implication of the answer, or (iii) a consequence of the answer, given the natural language content of the answer in the context of the knowledge about the subject-matter domain of the problem.

Thus, the application forms answer pair A1-A2. Now, the answer that forms A1 in the answer pair can be removed from further consideration in subsequent causation relationship analysis. Therefore, the application removes A1 from the sequence (block 410). The removal need not physically remove, delete, or otherwise destroy the answer, but just mark that answer as already considered for analysis. Now there is one-less remaining answers in the sequence.

The application submits the Q, A1-A2 to a Q and A system (block 412). The application receives a probability value from the Q and A system (block 414).

The application determines a level, band, or classification of the probability (block 416). Only as a non-limiting example, three classifications or bands are considered in process 400. Those of ordinary skill in the art will be able to modify process 400 to include the processing of more or fewer number of classifications in a similar manner and such adaptations are contemplated within the scope of the illustrative embodiments.

If the probability is in an acceptable band ("Acceptable" path of block 416), the application determines whether more answers remain in the sequence (block 418). If more answers remain in the sequence ("Yes" path of block 418), the application returns process 400 to block 406 to select the next answer pair.

If no more answers remain in the sequence ("No" path of block 418), the application computes an overall probability of the last answer—the ultimate answer in the sequence of block 402 or 404—being the root cause (block 420). In one embodiment, the overall probability is an average of the probabilities of each answer pair that is evaluated for causation relationship. Other methods of combining the probabilities of each answer pair, such as a weighted average, statistical mean, or other methods, to yield an overall probability are contemplated within the scope of the illustrative embodiments.

The application determines a band or classification of the overall probability computed in block 420 (block 422). Only as a non-limiting example, three classifications or bands are considered in process 400. Those of ordinary skill in the art will be able to modify process 400 to include the processing of more or fewer number of classifications in a similar manner and such adaptations are contemplated within the scope of the illustrative embodiments.

If the overall probability falls in an acceptable band or high band ("Close" path of block 422), the application triggers a workflow to close the problem report (block 424). The application ends process 400 thereafter.

If the overall probability falls in a questionable band or mid-band ("Review" path of block 422), the application triggers a workflow to review the root cause analysis of the problem (block 426). The application ends process 400 thereafter.

If the overall probability falls in an unacceptable band or low band ("Re-analyze" path of block 422), the application triggers a workflow to re-perform the root cause analysis of the problem (block 428). The application ends process 400 thereafter.

Back to block 416, if the probability of the answer pair falls in a questionable band or mid-band ("Review" path of block 416), the application triggers a workflow to review the root cause analysis of all or a part of the problem (block 426). The application ends process 400 thereafter.

If the probability of the answer pair falls in an unacceptable band or low band ("Re-analyze" path of block 422), the application triggers a workflow to re-perform the root cause analysis of all or a part of the problem (block 428). The application ends process 400 thereafter.

Thus, a computer implemented method, system or apparatus, and computer program product are provided in the illustrative embodiments for root cause analysis validation through inverse causation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   selecting, from a sequence of answers, a last remaining answer, wherein a set of answers in the sequence of answers are responsive to a set of questions resolved during an analysis of a reported problem in a data processing environment, and wherein the sequence of answers comprises more than two answers, and wherein the last remaining answer comprises a last answer in the sequence of answers;
   forming an answer pair using the last remaining answer and another answer which immediately precedes the last remaining answer in the sequence of answers, wherein the another answer which immediately precedes the last remaining answer comprises an answer immediately prior to the last remaining answer in the sequence of answers;
   submitting the answer pair to a question and answer (Q and A) system, wherein the Q and A system uses knowledge of a subject matter domain of the reported problem to determine a causal relationship between the answers in the answer pair and wherein the Q and A system determines a likelihood of said causal relationship between the answers in the answer pair given the knowledge of the subject matter domain of the reported problem, wherein the causal relationship links the last remaining answer to the previous answer in the sequence of answers based on the subject matter domain of the reported problem;
   determining a probability of the last remaining answer being caused by the other answer in the answer pair, wherein the probability is based on the likelihood of the causal relationship; and
   comparing the probability of the last remaining answer being caused by the other answer in the answer pair to an upper threshold and a lower threshold, wherein:
      in response to the probability being equal to or below the lower threshold, triggering a re-analysis workflow;
      in response to the probability being above the lower threshold and equal to or below the upper threshold, triggering a review workflow; or
      in response to the probability being above the upper threshold:
         marking the last remaining answer as ineligible for further consideration, the marking making the answer that immediately precedes the last remaining answer a new last remaining answer in the sequence;
         forming a new answer pair using the new last remaining answer and an answer that immediately precedes the new last remaining answer; and
         repeating the submitting, determining and comparing steps using the new answer pair until (1) all answer pairs result in probabilities above the upper threshold, triggering a closing workflow, (2) a review workflow is triggered, or (3) a re-analysis workflow is triggered.

2. The method of claim 1, further comprising:
computing an overall probability using a set of probabilities corresponding to a set of answer pairs formed from the sequence of answers; and
triggering, responsive to the overall probability being above an acceptance threshold value, a problem closure workflow for the reported problem.

3. The method of claim 1, further comprising:
forming a question to present to the Q and A system, the question requiring the Q and A system to compute the probability.

4. The method of claim 3, further comprising training the Q and A system about the subject-matter domain of the reported problem using the question, the answer pair, and the probability of the last remaining answer being caused by the other answer in the answer pair.

5. The method of claim 1, further comprising:
determining, for each answer in a set of answers obtained in a root cause analysis exercise for a problem, a convergence factor relative to the problem, the convergence factor resulting from a natural language processing (NLP) of each answer; and
arranging the set of answers in an increasing order of the convergence, the arranging resulting in the sequence of answers.

6. The method of claim 1, wherein the analysis is a root cause analysis wherein the sequence of answers is formed during the root cause analysis of a problem, wherein the sequence of answers corresponds to a sequence of questions answered in the root cause analysis.

7. A computer usable program product comprising one or more computer-readable storage devices, and program instructions stored on at least one of the one or more storage devices, the stored program instructions comprising:
program instructions to select, from a sequence of answers, a last remaining answer, wherein a set of answers in the sequence of answers are responsive to a set of questions resolved during an analysis of a reported problem in a data processing environment, and wherein the sequence of answers comprises more than two answers, and wherein the last remaining answer comprises a last answer in the sequence of answers;
program instructions to form an answer pair using the last remaining answer and another answer which immediately precedes the last remaining answer in the sequence of answers, wherein the another answer which immediately precedes the last remaining answer comprises an answer immediately prior to the last remaining answer in the sequence of answers;
program instructions to submit the answer pair to a question and answer (Q and A) system, wherein the Q and A system uses knowledge of a subject matter domain of the reported problem to determine a causal relationship between the answers in the answer pair and wherein the Q and A system determines a likelihood of said causal relationship between the answers in the answer pair given the knowledge of the subject matter domain of the reported problem, wherein the causal relationship links the last remaining answer to the previous answer in the sequence of answers based on the subject matter domain of the reported problem;
program instructions to determine a probability of the last remaining answer being caused by the other answer in the answer pair, wherein the probability is based on the likelihood of the causal relationship; and
program instructions to compare the probability of the last remaining answer being caused by the other answer in the answer pair to an upper threshold and a lower threshold, wherein:
in response to the probability being equal to or below the lower threshold, program instructions to trigger a re-analysis workflow;
in response to the probability being above the lower threshold and equal to or below the upper threshold, program instructions to trigger a review workflow; or
in response to the probability being above the upper threshold:
program instructions to mark the last remaining answer as ineligible for further consideration, the marking making the answer that immediately precedes the last remaining answer a new last remaining answer in the sequence;
program instructions to form a new answer pair using the new last remaining answer and an answer that immediately precedes the new last remaining answer; and
program instructions to repeat the submitting, determining and comparing steps using the new answer pair until (1) all answer pairs result in probabilities above the upper threshold, triggering a closing workflow, (2) a review workflow is triggered, or (3) a re-analysis workflow is triggered.

8. The computer usable program product of claim 7, further comprising:
program instructions to compute an overall probability using a set of probabilities corresponding to a set of answer pairs formed from the sequence of answers; and
program instructions to trigger, responsive to the overall probability being above an acceptance threshold value, a problem closure workflow for the reported problem.

9. The computer usable program product of claim 7, further comprising:
program instructions to determine, for each answer in a set of answers obtained in a root cause analysis exercise for a problem, a convergence factor relative to the problem, the convergence factor resulting from a natural language processing (NLP) of each answer; and
program instructions to arrange the set of answers in an increasing order of the convergence, the arranging resulting in the sequence of answers.

10. The computer usable program product of claim 7, wherein the analysis is a root cause analysis wherein the sequence of answers is formed during the root cause analysis of a problem, wherein the sequence of answers corresponds to a sequence of questions answered in the root cause analysis.

11. The computer usable program product of claim 7, further comprising:
program instructions to form a question to present to the Q and A system, the question requiring the Q and A system to compute the probability.

12. The computer usable program product of claim 11, further comprising program instructions to train the Q and A system about the subject-matter domain of the reported problem using the question, the answer pair, and the probability of the last remaining answer being caused by the other answer in the answer pair.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to select, from a sequence of answers, a last remaining answer, wherein a set of answers in the sequence of answers are responsive to a set of questions resolved during an analysis of a reported problem in a data processing environment, and wherein the sequence of answers comprises more than two answers, and wherein the last remaining answer comprises a last answer in the sequence of answers;

program instructions to form an answer pair using the last remaining answer and another answer which immediately precedes the last remaining answer in the sequence of answers, wherein the another answer which immediately precedes the last remaining answer comprises an answer immediately prior to the last remaining answer in the sequence of answers;

program instructions to submit the answer pair to a question and answer (Q and A) system, wherein the Q and A system uses knowledge of a subject matter domain of the reported problem to determine a causal relationship between the answers in the answer pair and wherein the Q and A system determines a likelihood of said causal relationship between the answers in the answer pair given the knowledge of the subject matter domain of the reported problem, wherein the causal relationship links the last remaining answer to the previous answer in the sequence of answers based on the subject matter domain of the reported problem;

program instructions to determine a probability of the last remaining answer being caused by the other answer in the answer pair, wherein the probability is based on the likelihood of the causal relationship; and program instructions to compare the probability of the last remaining answer being caused by the other answer in the answer pair to an upper threshold and a lower threshold, wherein:

in response to the probability being equal to or below the lower threshold, program instructions to trigger a re-analysis workflow;

in response to the probability being above the lower threshold and equal to or below the upper threshold, program instructions to trigger a review workflow; or in response to the probability being above the upper threshold:

program instructions to mark the last remaining answer as ineligible for further consideration, the marking making the answer that immediately precedes the last remaining answer a new last remaining answer in the sequence;

program instructions to form a new answer pair using the new last remaining answer and an answer that immediately precedes the new last remaining answer; and program instructions to repeat the submitting, determining and comparing steps using the new answer pair until (1) all answer pairs result in probabilities above the upper threshold, triggering a closing workflow, (2) a review workflow is triggered, or (3) a re-analysis workflow is triggered.

14. The computer system of claim 13, further comprising:
    program instructions to compute an overall probability using a set of probabilities corresponding to a set of answer pairs formed from the sequence of answers; and
    program instructions to trigger, responsive to the overall probability being above an acceptance threshold value, a problem closure workflow for the reported problem.

15. The computer system of claim 13, further comprising:
    program instructions to form a question to present to the Q and A system, the question requiring the Q and A system to compute the probability.

16. The computer system of claim 15, further comprising program instructions to train the Q and A system about the subject-matter domain of the reported problem using the question, the answer pair, and the probability of the last remaining answer being caused by the other answer in the answer pair.

17. The computer system of claim 13, further comprising:
    program instructions to determine, for each answer in a set of answers obtained in a root cause analysis exercise for a problem, a convergence factor relative to the problem, the convergence factor resulting from a natural language processing (NLP) of each answer; and
    program instructions to arrange the set of answers in an increasing order of the convergence, the arranging resulting in the sequence of answers.

18. The computer system of claim 13, wherein the analysis is a root cause analysis wherein the sequence of answers is formed during the root cause analysis of a problem, wherein the sequence of answers corresponds to a sequence of questions answered in the root cause analysis.

\* \* \* \* \*